United States Patent
Burgess (10) Patent No.: US 6,748,669 B1
(45) Date of Patent: Jun. 15, 2004

(54) HOVERING DRYING MACHINE

(76) Inventor: Stephen Peter Burgess, 59 Terry Rd., Box Hill, NSW (AU), 2765

(*) Notice: Subject to any disclaimer, the term of this patent is extended or adjusted under 35 U.S.C. 154(b) by 0 days.

(21) Appl. No.: 10/070,060

(22) PCT Filed: Aug. 30, 2000

(86) PCT No.: PCT/AU00/01024
§ 371 (c)(1),
(2), (4) Date: May 31, 2002

(87) PCT Pub. No.: WO01/16431
PCT Pub. Date: Mar. 8, 2001

(30) Foreign Application Priority Data

Aug. 30, 1999 (AU) .............................................. PQ2508

(51) Int. Cl.[7] ................................................ F26B 19/00
(52) U.S. Cl. ................................ 34/60; 34/218; 34/226
(58) Field of Search ........................... 34/90, 241, 92, 34/60, 201, 218, 219, 226

(56) References Cited

U.S. PATENT DOCUMENTS

| | | | | |
|---|---|---|---|---|
| 4,320,555 A | * | 3/1982 | Watson | 15/321 |
| 4,571,849 A | * | 2/1986 | Gardner et al. | 34/79 |
| 5,208,940 A | * | 5/1993 | London et al. | 15/345 |
| 5,392,492 A | * | 2/1995 | Fassauer | 15/327.3 |
| 5,797,197 A | * | 8/1998 | Alday | 34/618 |
| 6,282,746 B1 | * | 9/2001 | Schlecter | 15/302 |
| 2002/0193056 A1 | * | 12/2002 | Nielsen et al. | 451/350 |

OTHER PUBLICATIONS

Derwent Abstract Accession No. 86–244268/37, Lensovetispolkom, Jan. 30, 1986.

* cited by examiner

Primary Examiner—Henry Bennett
Assistant Examiner—Camtu Nguyen
(74) Attorney, Agent, or Firm—Gary R. Gillen; Wildman, Harrold, Allen & Dixon LLP (57) ABSTRACT

The present invention relates generally to a drying machine (10) comprising a frame structure (12), means for propelling air, and means for directing air. In this embodiment the drying machine (10) includes a flexible skirt (14) mounted about a perimeter of the frame structure (12). The frame structure (12) is a wing-type platform which includes an underlying cavity (16) which is substantially enclosed by the flexible skirt (14) to permit hovering of the frame structure (12). The propelling means includes a motor (18) which is operatively coupled to a fan (20) via a gearbox (22). The frame structure (12) is fabricated so as to define a duct (32) about the propeller (20) and the duct (32) provides a flow of air to both a main flow passage (34) and an auxiliary flow passage (36) which are separated by a dividing wall or splitter plate (38). The diverting means includes the auxiliary flow passage (36) which extends substantially across the frame structure (12) and at opposing ends connects to a respective flexible hose such as (40). Each of the hoses (40) at opposing ends is connected to respective opposing ends of a tubular element (42) which includes an elongate opening (44). The tubular element (42) forms part of the diverting means which directs air rearwardly of the drying machine and thus diverts air and moisture driven off the surface to be dried so that it is directed on board the drying machine (10).

17 Claims, 6 Drawing Sheets

FIG. 1.

HOVERING DRYING MACHINE

FIELD OF THE INVENTION

The present invention relates generally to a drying machine and relates particularly, though not exclusively, to an air cushioned vehicle or machine adapted to dry a playing surface of sporting fields or the like.

BACKGROUND TO THE INVENTION

There are known machines for drying the playing surface of sporting fields. These machines are driven or pushed across the playing surface with wheels and/or rollers contacting the surface. An inherent problem with drying machines of this construction is that the weight of the machine on the porous grass surface tends to draw water to the top surface of the grass. That is, the machine itself will promote moisture on the playing surface which must be dried or removed together with the initial surface moisture. It is understood that larger drying machines may provide adequate drying although to some extent the increased weight further exasperates the drawing of water from below the surface. Furthermore, these relatively large drying machines can be difficult to transport from site to site. Another technique conventionally adopted to dry sporting fields utilises a helicopter which drives moisture from the playing surface. However, this technique is not widely used as the charter or operation of helicopters is relatively expensive. Furthermore, both the helicopter and more conventional drying machines disperse the surface moisture and water rather than collecting it.

SUMMARY OF THE INVENTION

According to the present invention there is provided a drying machine comprising:

a frame structure including a perimeter wall which defines an underlying cavity;

means for propelling air into the cavity at a relatively high velocity wherein the frame structure is adapted to hover across a surface to be dried and the high velocity air is effective in driving moisture or water from the surface and outwardly of the cavity, said propelling means being operatively coupled to the frame structure; and means for diverting air together with the moisture or water driven from the surface, said diverting means being operatively coupled to the frame structure whereby the air and moisture or water driven from the surface can be collected externally of the cavity and within the drying machine.

Typically the diverting means includes a diversion element mounted to the frame structure and at least in part defining an auxiliary flow passage whereby the high velocity air from the underlying cavity is directed through the auxiliary flow passage so as to promote the collection of the air and moisture or water within the machine. More typically the diversion element is operatively coupled to a forward edge of the frame structure of the drying machine.

Preferably the drying machine also comprises means for collecting the air and moisture driven from the surface. More preferably said collecting means includes a screen element connected to the frame structure to define an enclosed space forward of the frame structure whereby the diverted high velocity air flowing through the auxiliary flow passage deflects the air and moisture or water driven off the surface and into the enclosed space.

Typically the collecting means further comprises one or more tanks mounted to the frame structure, said tanks operatively communicating with the screen element for collection of a moisture fraction of the air and moisture driven from the surface. More typically the collecting means includes a series of vanes or louvres connected to the frame structure and disposed above one or more of the tanks to promote condensation of the moisture into said tanks.

Preferably the propelling means includes a motor coupled to a fan which is arranged to provide the required high velocity downward airflow for hovering of the frame structure. More preferably the motor is coupled to the fan via a gearbox.

Typically the drying machine includes a flexible skirt mounted about and at least partially defining the perimeter of the frame structure, said flexible skirt being configured to substantially enclose the cavity of the frame structure to provide an air cushion for the machine.

Preferably the drying machine includes a handle connected to the frame structure and designed to permit movement of the machine by hand.

Generally the drying machine is adapted for drying of a grassed surface such as a sporting field.

BRIEF DESCRIPTION OF THE DRAWINGS

In order to achieve a better understanding of the nature of the present invention a preferred embodiment of a drying machine will now be described in some detail, by way of example only, with reference to the accompanying drawings in which.

DETAILED DESCRIPTION OF THE PREFERRED EMBODIMENTS

As shown in FIGS. 1 to 4 there is a drying machine shown generally as 10 comprising a frame structure 12, means for propelling air, and means for directing air. In this embodiment the drying machine 10 includes a flexible skirt 14 mounted about a perimeter of the frame structure 12. The frame structure 12 is a wing-type platform which includes an underlying cavity depicted generally as 16 which is substantially enclosed by the flexible skirt 14 to permit hovering of the frame structure 12.

The propelling means of this example of the drying machine 10 includes a motor 18 which is operatively coupled to a fan 20 via a gear box 22. A drive shaft 24 is coupled between the motor 18, which is preferably a petrol engine, and the gearbox 22. The wing-type platform 12 of this particular construction is generally square-shaped having a lower platform 26 to which the motor or petrol engine 18 and the gear box 22 are rigidly mounted. Either side of the lower platform 26 there is provided a pair of water storage tanks such as 28. Each of the tanks 28 is partly enclosed with a removable cover or canopy such as 30.

Importantly, the frame structure 12 is fabricated so as to define a duct 32 about the propeller 20. The duct 32 provides a flow of air to both a main flow passage 34 and an auxiliary flow passage 36 which are separated by a dividing wall or splitter plate 38. The main duct 34 receives a flow of air which is directed into the underlying cavity 16 of the frame structure 12 to effect its hovering.

The diverting means includes the auxiliary flow passage 36 which is formed forward of the splitter plate 38. The auxiliary flow passage 36 extends substantially across the frame structure 12 and at opposing ends connects to a respective flexible hose such as 40. Each of the hoses 40 at an opposing end is connected to respective opposing ends of a tubular element 42. In this embodiment the tubular element 42 is sealed except for an elongate opening 44 which extends substantially along its length. The tubular element 42 is in cross-section formed as a substantially circular pipe with a flattened lower surface which defines a foot which rests on the surface to be dried. The tubular element 42 includes an acutely angled rearward section which is formed together with the circular-shaped forward section. In this example the tubular element 42 can "float" in its vertical disposition relative to the frame structure 12 of the drying machine 10.

The drying machine 10 of this particular construction also comprises means for collecting air and moisture driven from the surface underlying the frame structure 12. The collecting means includes a screen element 46 which is formed of resiliently flexible material and extends across the front section of the drying machine 10. The screen element or wind screen 46 is at a lower edge connected to the tubular element 42 and at an upper edge connected to an upper portion of the frame structure 12. The windscreen 46 thus defines an enclosed space 48 in the forward section of the drying machine 10. However, the enclosed space 48 is slightly open at its lower extremity to permit the passage of air and moisture driven from the surface to be dried. Although not illustrated it will be appreciated that the windscreen 46 and tubular element 42 has a flexible seal at either end so as to enclose the enclosed space 48. The front portion of the flexible skirt 14 is shaped differently to the side and rear portions wherein air flow is encouraged from underneath the frame structure 12 and into the enclosed space 48.

Figure 5:
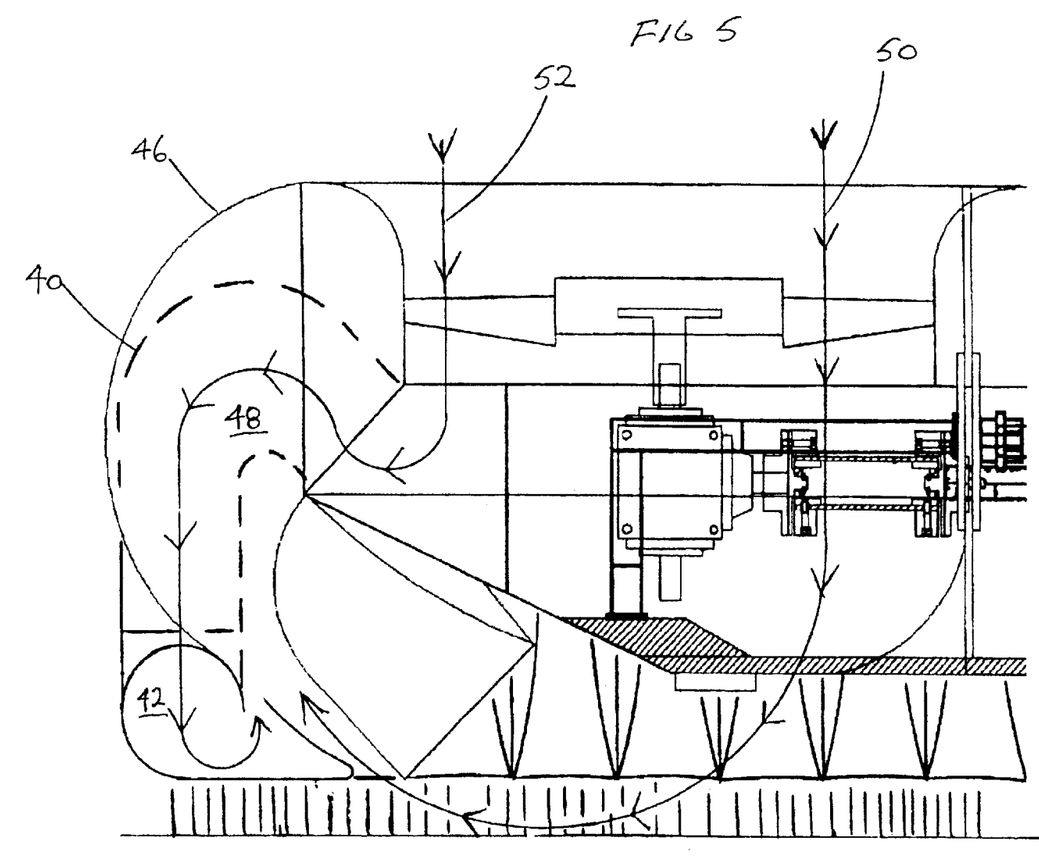
FIG. 5 is an enlarged sectional view of a forward part of the drying machine of FIG. 1.
Figure 6:
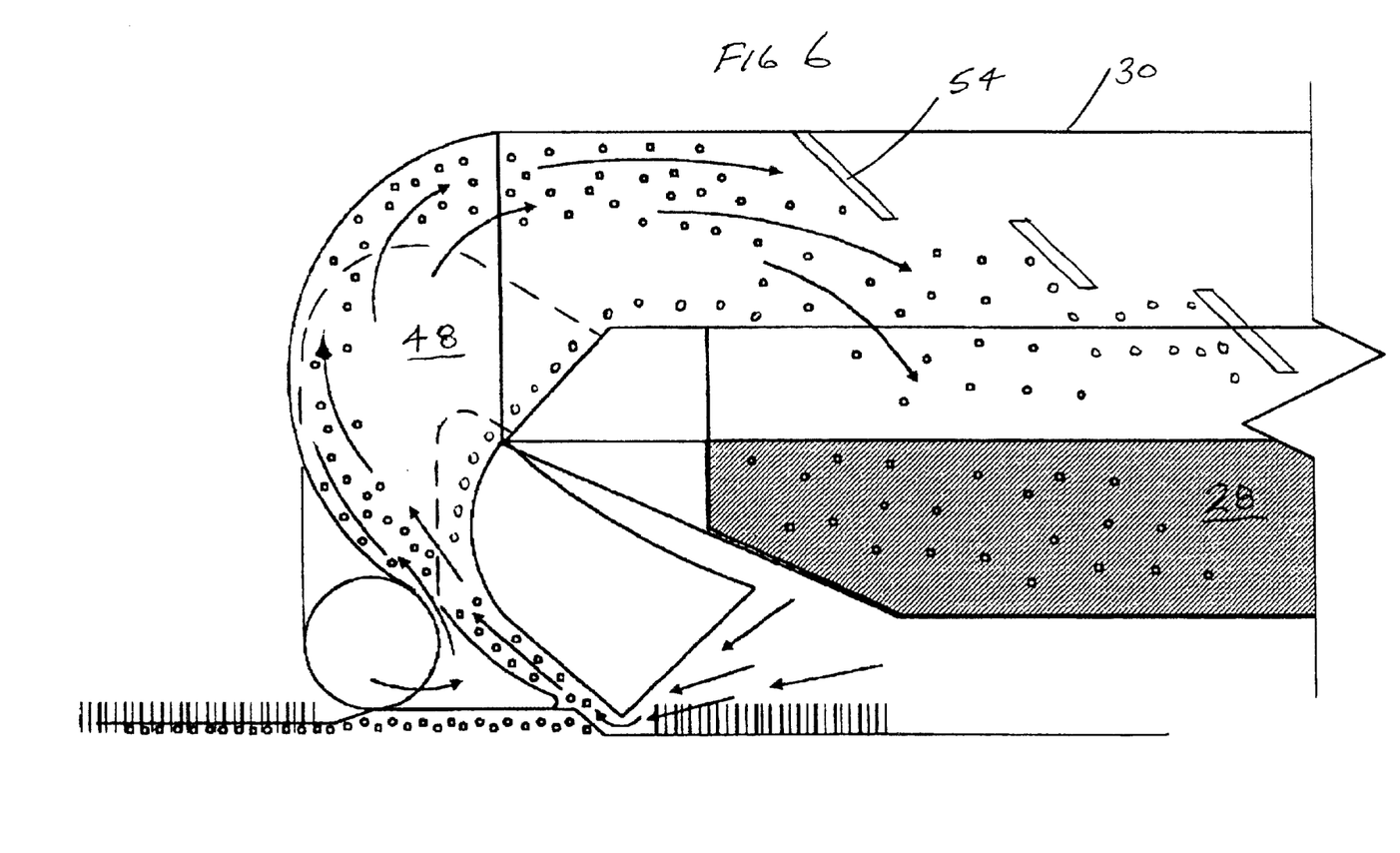
FIG. 6 is an enlarged sectional view of a forward part of the drying machine taken through one of the tanks.

FIGS. 5 and 6 schematically illustrate the air and moisture flows within the forward section of the drying machine 10. The arrowed line designated as 50 illustrates the flow of air which effects hovering of the frame structure 12 and drives moisture from the surface to be dried in a forward direction. The arrowed line designated as 52 depicts the diverted air flow through the auxiliary flow passageway 36 to the tubular element 42 whereupon it "combines" with the air and moisture driven from the surface to be dried so as to deflect the flow inwardly of the enclosed space 48. It is also understood that the flow of diverted air exiting the opening 44 of the tubular element 42 has a venturi effect in drawing the air and moisture into the enclosed space 48.

As best shown in FIG. 6 the enclosed space 48 extends upwardly into the space located above each of the storage tanks 28 and enclosed by the removable canopy 30. Thus, the moisture and air is driven through the enclosed space 48 and deflected rearwardly of the drying machine 10 via the windscreen 46. In this embodiment of the invention the removable cover or canopy such as 30 is provided with transversely extending vanes or louvres such as 54 which allow air to travel along and escape from the canopy 30 whilst the moisture is directed downwardly into the tanks such as 28. That is, the combined effects of the diverting means and the collecting means allow moisture driven from the surface being dried to be collected by the drying machine 10. The diverted flow of air and moisture from the enclosed space 48 is also shown schematically by the series of flow arrows of FIG. 7.

Figure 1:
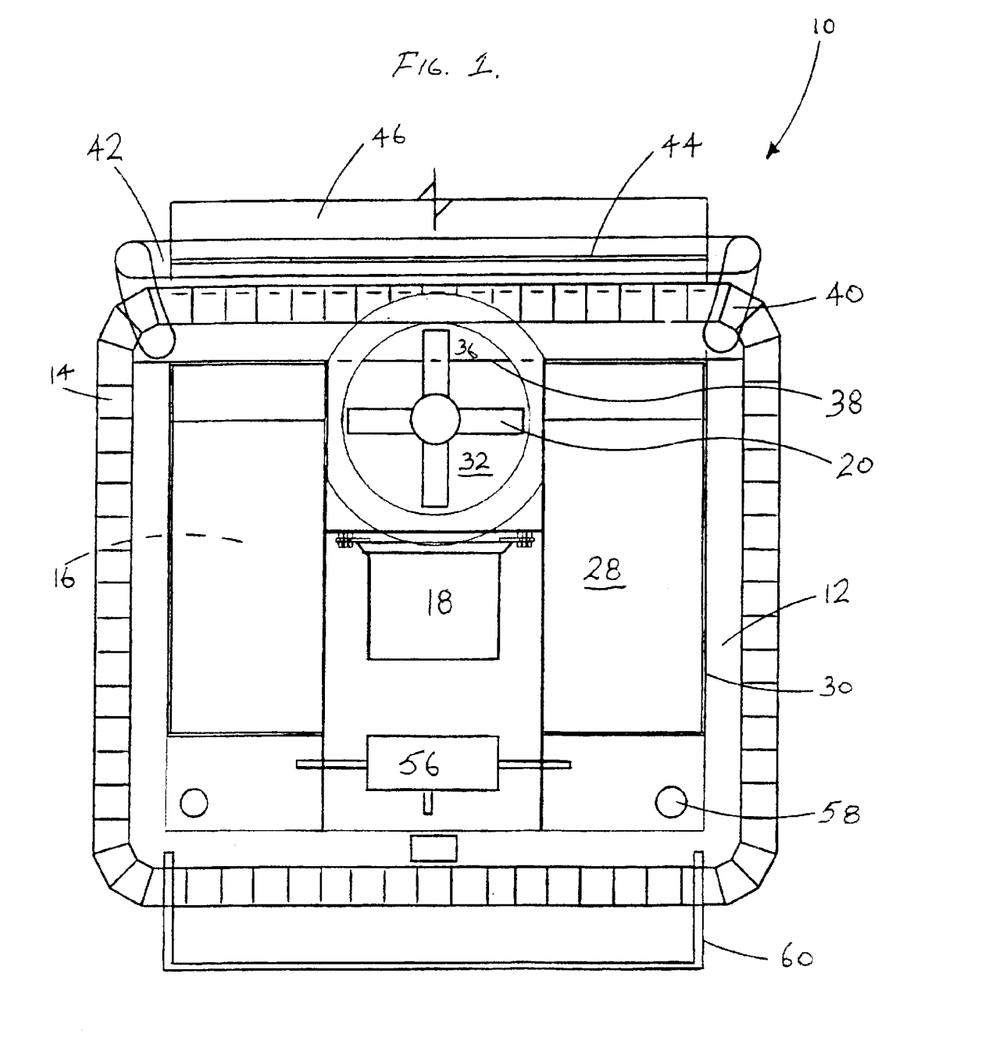
FIG. 1 is a schematical plan view of a drying machine.
Figures 2, 3:
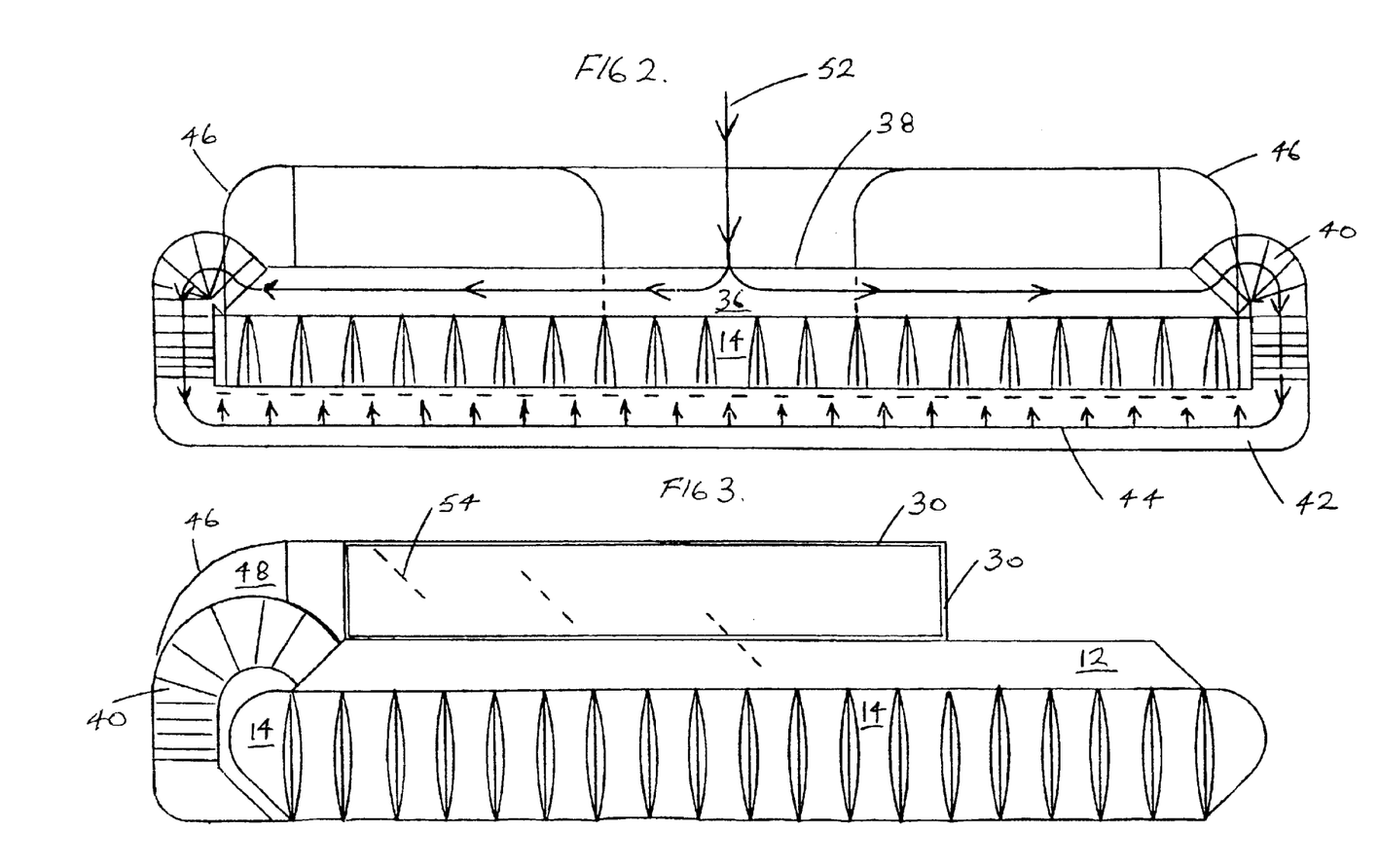
FIG. 2 is a schematic front view of the drying machine of FIG. 1.
FIG. 3 is a schematic side view of the drying machine of FIG. 1.
Figure 4:
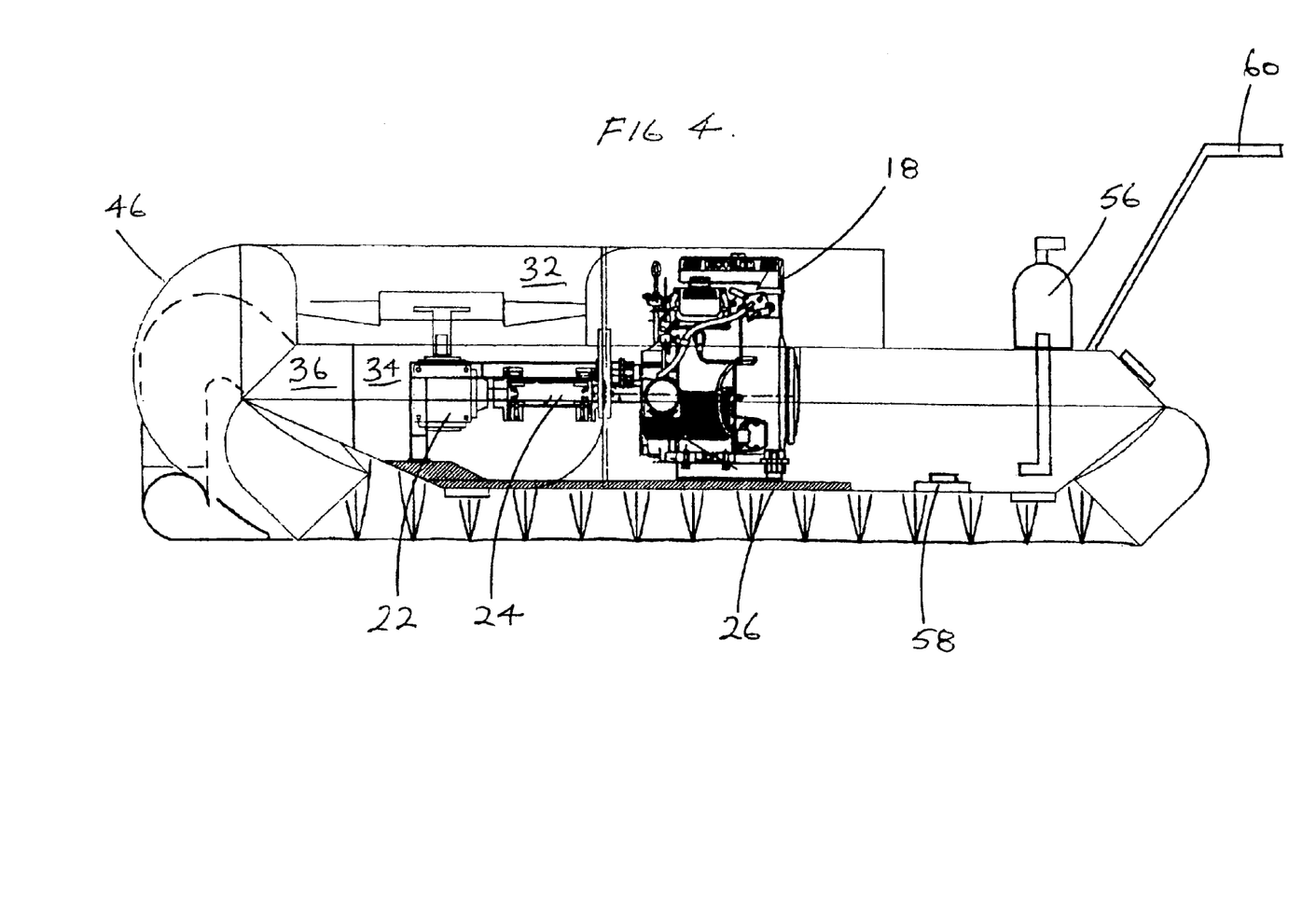
FIG. 4 is a sectional view of the drying machine of FIG. 1.

The drying machine 10 is also provided with various means for evacuating or emptying the tanks such as 28. As best shown in FIG. 4 the drying machine 10 is provided with a pump 56 which upon activation empties water from either one or both of the tanks 28. Additionally, the tanks 28 may be provided with water dump plugs 28 which are threaded in a lower surface of the tank 28 and upon removal discharge water from the tank 28. The drying machine 10 also includes a handle 60 which is anchored to and protrudes from a rear portion of the frame structure 12. The handle 60 which is generally a pair of handles allows movement of the drying machine 10 across the surface to be dried.

In order to facilitate a further understanding of the invention, operation of the drying machine 10 described will now be outlined according to the following general steps:

(i) the motor 18 is activated so as to effect rotation of the propeller 20;

(ii) the propeller 20 provides a forceful flow of air downwardly through the duct 32 so as to effect hovering of the frame structure 12 across the surface to be dried;

(iii) the dividing wall or splitter plate 30 diverts a portion of the "hovering air" into the tubular element 42 which releases the diverted air into the enclosed space 48 wherein moisture driven from the surface to be dried is driven through the enclosed space 48;

(iv) the air and moisture mixture is directed rearwardly of the enclosed space 48 by means of the windscreen 46 whereupon the air and moisture strikes the louvres such as 54 above the tanks such as 28;

(v) the moisture then falls into the tanks such as 28 and the air is released rearwardly of the tanks and removable canopy such as 28 and 30 respectively;

(vi) water in the tanks 28 is intermittently dumped or pumped from the tanks.

The drying machine 10 in a similar fashion to a hovercraft hovers on an air cushion formed by the drying machine 10. The drying machine 10 can thus be moved across the surface to be dried with relative ease. Moisture is driven from the surface as a forward wave in the direction of travel of the drying machine 10 and is diverted and collected within the tanks such as 28 of the drying machine 10. It is also understood that the drying machine 10 is sufficiently forceful to push or drive a wave of liquid or water which is below the surface in the direction of travel of the machine. That is, the relatively high pressure cushion which is effected by the drying machine both lifts the frame structure 12 and is understood to lower the table beneath the boundary of the frame structure 12. This is understood to create a wave forward of the drying machine 10 which is driven to the surface and diverted into the collection system of the described embodiment of the invention. In its preferred form the drying machine is adapted to provide drying of grassed playing surfaces such as that of a sporting field or pitch.

The drying machine 10 is designed to carry relatively large payloads which are in the form of the water driven from the surface to be dried and collected in the drying machine 10. The increased payloads increase the demand for downward air pressure which increases the drying effect of the machine 10. Furthermore, in this embodiment the machine 10 is configured to provide an intense air flow at its forward edge which is deflected inwardly of the machine for collection of the moisture which is driven from the surface to be dried.

Figure 7:
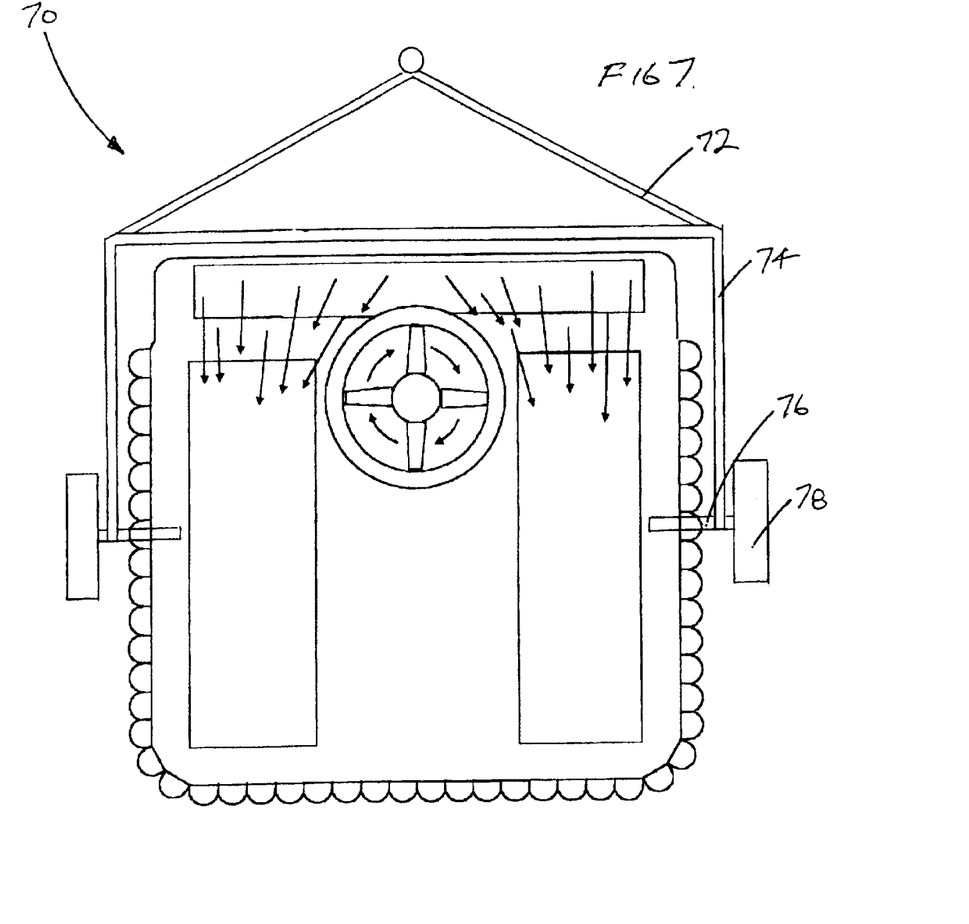
FIG. 7 is a schematic plan view of a drawbar attachment.

As shown in FIG. 7 the drying machine 10 may be provided with a drawbar attachment shown generally as 70 for transportation of the drying machine 10. The attachment 70 includes a draw bar arrangement 72 which is connected to a part chassis 74. A pair of stub axles such as 76 are mounted to the chassis 74 with a wheel 78 fixed to each of the stub axles 76. The chassis 74 is designed to provide a platform for the drying machine 10 when not in use. Alternatively the drawbar attachment is permanently mounted to the drying machine 10. The axle(s) are in this embodiment sprung so that during operation the wheels lightly contact the ground to avoid sideways movement of the hovering drying machine 10.

Now that a preferred embodiment of the invention has been described in some detail it will be apparent to those skilled in the art that the described embodiment of the drying machine has at least the following advantages:

(i) the drying machine hovers across the surface to be dried wherein moisture is driven from the surface without the inherent problems of traditional "wheeled" drying machines;

(ii) hovering of the drying machine means that it can be moved across the surface to be dried with relative ease;

(iii) the drying machine includes a spread payload in the form of water contained in the storage tanks which promotes a vertically downward flow of air in drying the surface;

(iv) the drying machine effects a wave of liquid in the direction of its movement, the wave being diverted by the diverting means to permit collection of the mixture or liquid.

Those skilled in the art will appreciate that the invention described herein is susceptible to variations and modifications other than those specifically described. For example, the specific configuration of the frame structure may vary provided it permits hovering of the machine whilst driving and diverting moisture from the surface to be dried. The diverting means may not be in the preferred form described but rather extends to any configuration which is effective in utilising the inherent effect of the "hovercraft" in diverting the repelled moisture on board the drying machine.

All such variations and modifications are to be considered within the scope of the present invention the nature of which is to be determined from the foregoing description.

What is claimed is:

1. A drying machine comprising:

a frame structure including a perimeter wall which defines an underlying cavity;

a screen element connected to the frame structure and defining an enclosed space within the drying machine, wherein the enclosed space is external of the perimeter wall and is in fluid communication with the underlying cavity;

means for propelling air into the underlying cavity at a relatively high velocity wherein the frame structure is adapted to hover across a surface to be dried and the high velocity air is effective in driving moisture or water from the surface and outwardly of the underlying cavity into the enclosed space within the drying machine, said propelling means being operatively coupled to the frame structure; and means operatively coupled to the frame structure and arranged to divert the air with the moisture or water driven from the surface through the enclosed space for collection of the moisture or water externally of the underlying cavity.

2. The drying machine of claim 1 wherein the diverting means includes a diversion element mounted to the frame structure and at least in part defining an auxiliary flow passage whereby the high velocity air from the underlying cavity is directed through the auxiliary flow passage so as to promote collection of the air and moisture or water within the machine.

3. The drying machine of claim 2 further comprising means for collecting the air and moisture or water driven from the surface.

4. The drying machine of claim 3 wherein said collecting means includes a screen element connected to the frame structure to define an enclosed space forward of the frame structure whereby the diverted high velocity air flowing through the auxiliary flow passage deflects the air and moisture or water driven off the surface and into the enclosed space.

5. The drying machine of claim 4 wherein the collecting means further comprises at least one tank mounted to the frame structure, said at least one tank operatively communicating with the screen element for collection of a fraction of the air and moisture driven from the surface.

6. The drying machine of claim 5 wherein the collecting means includes a series of vanes connected to the frame structure and disposed above at least one of the tanks to promote condensation of the moisture into said at least one of the tanks.

7. The drying machine of claim 5 wherein the collecting means includes a series of louvers connected to the frame structure and disposed above at least one of the tanks to promote condensation of the moisture into said at least one of the tanks.

8. The drying machine of claim 2 wherein the diversion element is operatively coupled to a forward edge of the frame structure of the drying machine.

9. A drying machine as defined in claim 8 further comprising means for collecting the air and moisture or water driven from the surface.

10. A drying machine as defined in claim 9 wherein said collecting means includes a screen element connected to the frame structure to define an enclosed space forward of the frame structure whereby the diverted high velocity air flowing through the auxiliary flow passage deflects the air and moisture or water driven off the surface and into the enclosed space.

11. A drying machine as defined in claim 10 wherein the collecting means further comprises at least one tank mounted to the frame structure, said at least one tank operatively communicating with the screen element for collection of a fraction of the air and moisture driven from the surface.

12. A drying machine as defined in claim 11 wherein the collecting means includes a series of vanes connected to the frame structure and disposed above at least one of the tanks to promote condensation of the moisture into said at least one of the tanks.

13. The drying machine of claim 11 wherein the collecting means includes a series of louvers connected to the frame structure and disposed above at least one of the tanks to promote condensation of the moisture into said at least one of the tanks.

14. The drying machine of claim 1 wherein the propelling means includes a motor coupled to a fan which is arranged to provide the required downward high velocity airflow for hovering of the frame structure.

15. The drying machine of claim 14 wherein the motor is coupled to the fan via a gearbox.

16. The drying machine of claim 14 further comprising a flexible skirt mounted about and at least in part defining the perimeter of the frame structure, said flexible skirt being configured to substantially enclose the cavity of the frame structure to provide an air cushion for the machine.

17. The drying machine of claim 14 further comprising a handle connected to the frame structure and designed to permit movement of the machine by hand.

* * * * *